US008139861B2

(12) United States Patent
Shimodaira

(10) Patent No.: US 8,139,861 B2
(45) Date of Patent: Mar. 20, 2012

(54) CHARACTER EXTRACTING APPARATUS, METHOD, AND PROGRAM

(75) Inventor: Masato Shimodaira, Tokyo (JP)

(73) Assignee: Keyence Corporation, Osaka (JP)

( * ) Notice: Subject to any disclaimer, the term of this patent is extended or adjusted under 35 U.S.C. 154(b) by 1195 days.

(21) Appl. No.: 11/898,626

(22) Filed: Sep. 13, 2007

(65) Prior Publication Data

US 2008/0063271 A1    Mar. 13, 2008

(30) Foreign Application Priority Data

Sep. 13, 2006  (JP) ................................. 2006-248369
Aug. 24, 2007  (JP) ................................. 2007-218700

(51) Int. Cl.
    *G06K 9/38* (2006.01)
    *G06K 9/34* (2006.01)
(52) U.S. Cl. ..................... 382/182; 382/172; 382/177
(58) Field of Classification Search .......... 382/168–189, 382/254, 270, 190, 192, 194, 232, 273, 195, 382/199, 209, 276, 282; 358/448, 462, 464, 358/1.1, 1.9, 2.1, 1.11, 1.2, 1.18
    See application file for complete search history.

(56) References Cited

U.S. PATENT DOCUMENTS 5,825,920 A * 10/1998 Kitamura et al. ............. 382/178
6,535,619 B1 * 3/2003 Suwa et al. ................... 382/101
7,003,159 B2 * 2/2006 Yamaai ........................ 382/199
7,047,238 B2 * 5/2006 Tada et al. ............................. 1/1
7,142,716 B2 * 11/2006 Katsuyama et al. .......... 382/190
2004/0213444 A1 * 10/2004 Yamamichi ................... 382/128

FOREIGN PATENT DOCUMENTS

JP          6-52355 A       2/1994
JP          6-215181 A      8/1994
JP          2872768 B       1/1999

* cited by examiner

*Primary Examiner* — Sheela Chawan
(74) *Attorney, Agent, or Firm* — Smith Patent Office

(57) ABSTRACT

The present invention provides a technique of accurately extracting areas of characters included in a captured image even in a case where noise or dirt of a relatively large area occurs in a background image. A pixel value integration evaluation value is obtained by integrating pixel values in a character extracting direction B at each of the pixel positions in a character string direction A of an image including a character string. A waveform of the value is expressed as waveform data. A first threshold and a second threshold are set for the waveform data. An area in which the waveform data exceeds the first threshold is set as a character candidate area. In a case where an area in which the pixel value integration evaluation value exceeds the second threshold exists in the character candidate areas, the character candidate area is regarded as a true character area and the characters are extracted.

16 Claims, 12 Drawing Sheets

CHARACTER EXTRACTING APPARATUS, METHOD, AND PROGRAM

BACKGROUND OF THE INVENTION

1. Field of the Invention

The present invention relates to a technique for extracting a character area from a captured image.

2. Description of the Related Art

By capturing an image of characters printed on a commodity or product with an image acquisition device, for example, a two dimensional image acquisition device using a CCD, CMOS or the like, and performing a character recognizing process in an image processing apparatus, a process of recognizing the print can be automated.

To perform the character recognizing process with a high precision, a character extracting process as a pre-process of the character recognizing process is important in the image processing apparatus.

The character extracting process is a process of determining a character area included in a captured image. In a case where a captured image includes a character string made of a plurality of characters, each of the character areas corresponding to each character in the character string has to be determined from the character string.

One of the methods of extracting a character string is a method utilizing projection data of an image. Specifically, waveform data obtained by integrating pixel values of a captured image in an extraction direction is generated and analyzed. A fact is utilized that a pixel integration value of a character part is larger than that in a background part (in a case where a character is black, it is sufficient to make the pixel integration value of the character part large by reversal), and an area in which the pixel integration value exceeds a predetermined threshold is recognized as a character area.

FIG. 11 is a diagram showing an image 90 of a medium on which characters "AB450" are printed and waveform data 91 generated from the image 90. The waveform data 91 are data obtained by integrating pixel values in a character extracting direction Y at a coordinate position in a character string direction X of the image 90. For easier explanation, the waveform data 91 and the image 90 including the characters "AB450" are shown so as to be aligned in the character string direction X. It is understood from the figure that the pixel integration values of the character portions are larger than the pixel integration values of the background part.

Noise 95 occurred between the character "B" and the character "4". The noise part also has a pixel integration value larger than that of the background part.

Therefore, to exclude the noise 95 from the character area, the threshold has to be set to a value larger than the pixel integration value of the area of the noise 95. Consequently, by setting a threshold 92 at a position as shown in FIG. 11, which is larger than the pixel integration value of the area of the noise 95, the noise 95 can be excluded from the character area. However, when the character area is determined by using the threshold 92 set by the above-described method, a center region of a character having a small pixel integration value such as the character "O" is excluded from the character area. That is, the area corresponding to the character "O" is erroneously recognized as two character areas.

To accurately extract the character "O", the threshold has to be set lower than the above-described value. For example, when a threshold 93 is set at a position as shown in FIG. 12, the character "O" can be extracted accurately. However, when the threshold 93 is used, the noise 95 is also recognized as a character area. As described above, the method of adjusting the threshold cannot satisfy both the purpose of reliably excluding noise and a purpose of extracting the whole character area including an area having a low pixel integration value.

There is also a method of providing a threshold for the width of the extracted character area. That is, when the width of the area extracted as the character area is narrower than a predetermined width, the area is determined as noise and excluded from the character area. However, in a case where the density difference from the background is smaller but there is noise or dirt of a wide area whose size is close to a character, the noise cannot be eliminated.

Japanese Patent Publication No. 2,872,768 discloses a method of setting a search start point and a search end point in an image, integrating pixel values of pixels passing a path connecting the start and end points, and finding a path in which the integration value is the minimum. According to the method, although a character area can be extracted accurately, a search start point, a search end point, and a search area connecting the points have to be set in advance. That is, the method can be executed on the condition that a character boundary area can be predicted to some extent.

SUMMARY OF THE INVENTION

In view of the above problems in the conventional technologies, an object of the present invention is to provide a technique of accurately extracting areas of characters included in a captured image even in a case where noise or dirt of a relatively large area occurs in a background image.

In order to achieve the above and other objects, according to a first aspect of the present the present invention, there is provided an apparatus for extracting each character from a character string having a plurality of characters arranged in a first direction and included in an image. The apparatus comprises: an integrating device integrating pixel values along a second direction orthogonal to the first direction for all coordinate positions in the first direction of the image; a first threshold setting device setting a first threshold; an extracting device extracting an area corresponding to a coordinate position along the first direction where the integrated pixel value exceeds the first threshold set by the first threshold setting device as a character candidate area; a second threshold setting device setting a second threshold that is larger than the first threshold set by the first threshold setting device; and a recognition device determining, with respect to the character candidate areas, whether an area in which the integrated pixel value exceeds the second threshold exists or not, and recognizing the area in which the integrated pixel value exceeds the second threshold as a character area.

In order to achieve the above and other objects, according to a second aspect of the present invention, there is provided a method for extracting each character from a character string having a plurality of characters arranged in a first direction and included in an image, The method comprises the steps of: integrating pixel values along a second direction orthogonal to the first direction for all coordinate positions in the first direction of the image; setting a first threshold; extracting an area corresponding to a coordinate position along the first direction where the integrated pixel value that exceeds the first threshold as a character candidate area; setting a second threshold which is larger than the first threshold; and determining, with respect to the character candidate areas, whether an area in which the integrated pixel value exceeds the second threshold exists or not, and recognizing the area in which the integrated pixel value exceeds the second threshold as a character area.

In order to achieve the above and other objects, according to a third aspect of the present invention, there is provided a computer readable medium including a program for extracting each character from a character string having a plurality of characters arranged in a first direction and included in an image. The program including an integrating device integrating pixel values along a second direction orthogonal to the first direction for all coordinate positions in the first direction of the image; a first threshold setting device setting a first threshold; an extracting device extracting an area corresponding to coordinate position along the first direction where the integrated pixel value exceeds the first threshold set by the first threshold setting device as a character candidate area; a second threshold setting device setting a second threshold that is larger than the first threshold set by the first threshold setting device; and a recognition device determining, with respect to the character candidate areas, whether an area in which the integrated pixel value exceeds the second threshold exists or not, and recognizing the area in which the integrated pixel value exceeds the second threshold as a character area.

Therefore, even noise whose density is not so different from the background but having a relatively wide area and having a size close to that of a character can also be accurately eliminated.

Since noise is eliminated by using the second threshold provided separately from the first threshold without operating the first threshold for extracting characters, the adverse influence is not exerted on the area of a character extracted.

DETAILED DESCRIPTION OF THE PREFERRED EMBODIMENTS

Outline of the System

Figure 1:
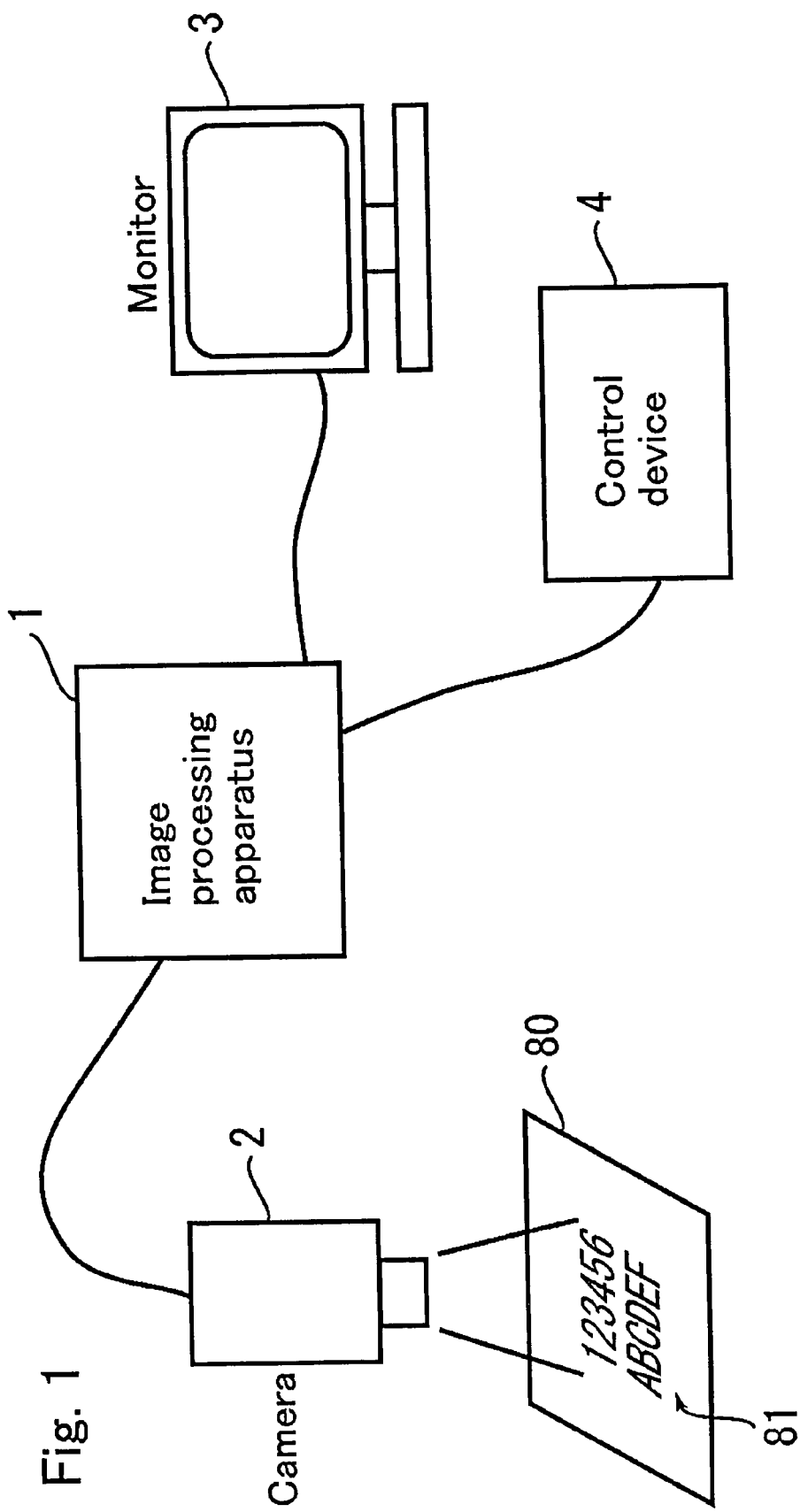
FIG. 1 is a general view of an image processing system according to an embodiment of the invention.

An embodiment of the present invention will be described below with reference to the drawings. FIG. 1 is a general view of an image processing system of an embodiment. The image processing system has an image processing apparatus 1, a camera 2, and a monitor 3. The camera 2 has an imaging sensor such as a CCD or CMOS and an optical unit. As the monitor 3, for example, a liquid crystal display is used. The image processing apparatus 1 is connected to a control device 4 controlled by a process of the image processing system.

In the image-processing system, an image of characters 81 printed on a medium 80 is captured by the camera 2, and the image processing apparatus 1 analyzes the image captured by the camera 2. An analysis result and process data are properly displayed on the monitor 3. When characters are finally recognized from the captured image in the image processing apparatus 1, the control device 4 is controlled in accordance with the recognition result.

The medium 80 on which the characters 81 are printed may be, for example, a medium adhered on a product or a package itself of an article. The image processing apparatus 1 recognizes the characters 81 printed on the product or article, thereby performing a task of checking a product/article manufacturing process, a conveying process, or the like.

Figure 2:
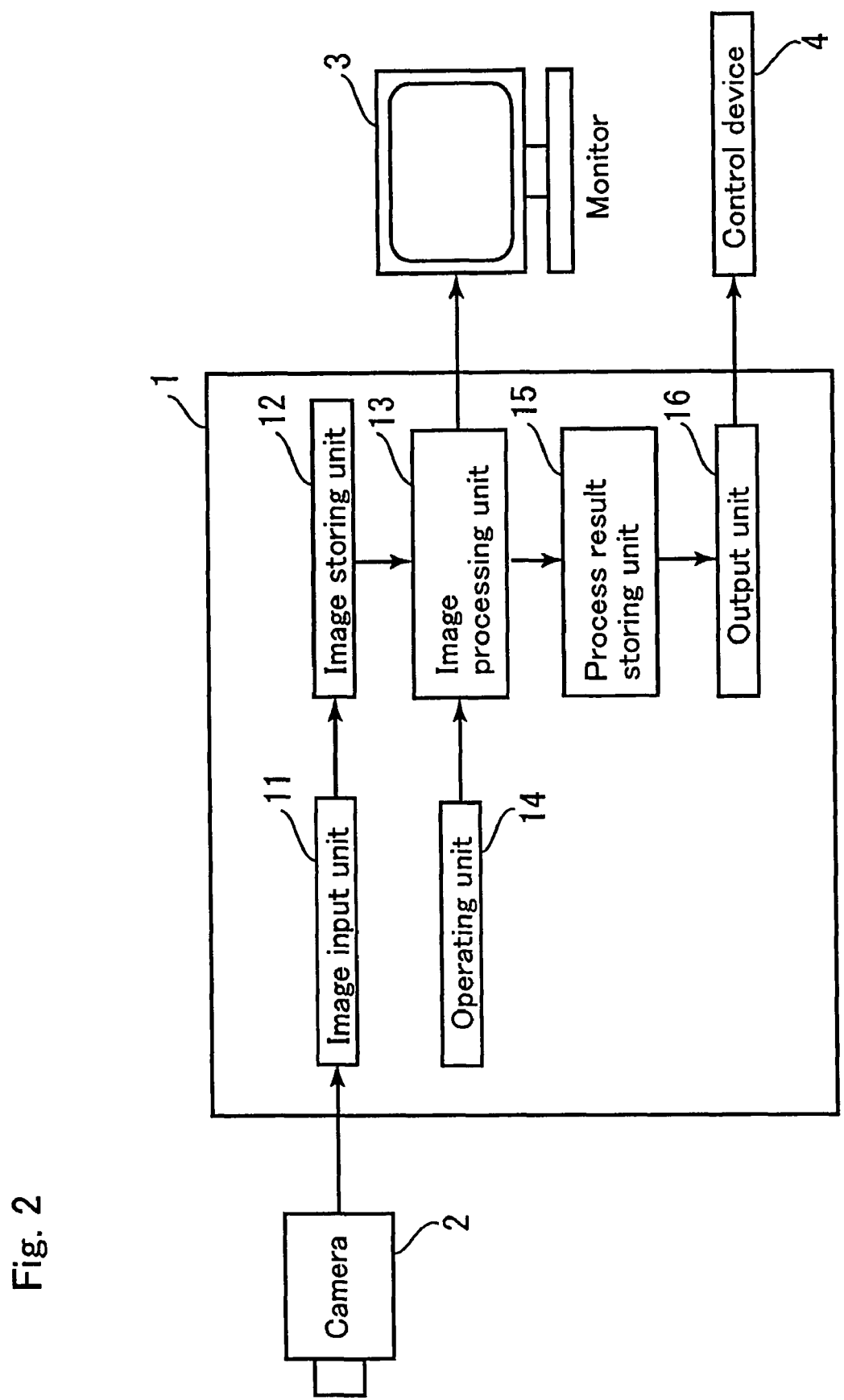
FIG. 2 is a block diagram of an image processing apparatus.

FIG. 2 is a diagram showing functional blocks of the image processing apparatus 1. The image processing apparatus 1 has, as shown in the figure, an image input unit 11, an image storing unit 12, an image processing unit 13, an operating unit 14, a process result storing unit 15, and an output unit 16.

An image captured by the camera 2 is input to the image processing apparatus 1 by way of the image input unit 11 and once stored in the image storing unit 12. The image-processing unit 13 executes a process of extracting each character from the captured image stored in the image storing unit 12 and a character recognizing process corresponding to each character. The present invention is characterized by the character extracting process, and the details of the character extracting process will be described later. For the character recognizing process, a known method is used. The character recognition result is stored in the process result storing unit 15. The process result data is output to the outside by the output unit 16 and, for example, the control device 4 is controlled according to the process result data.

The image processing apparatus 1 also has the operating unit 14. The operating unit 14 is constructed of, for example, dials, key buttons, and the like. By operating the operating unit 14, the user can provide various instructions to the image processing apparatus 1. For example, parameters of the image processing and the like can be set. On the monitor 3, a screen for setting process parameters, for showing a process result, and the like are displayed. By referring to the screen displayed on the monitor 3, the user sets the parameters and recognizes the process result.

Character Extracting Method

Figure 3:
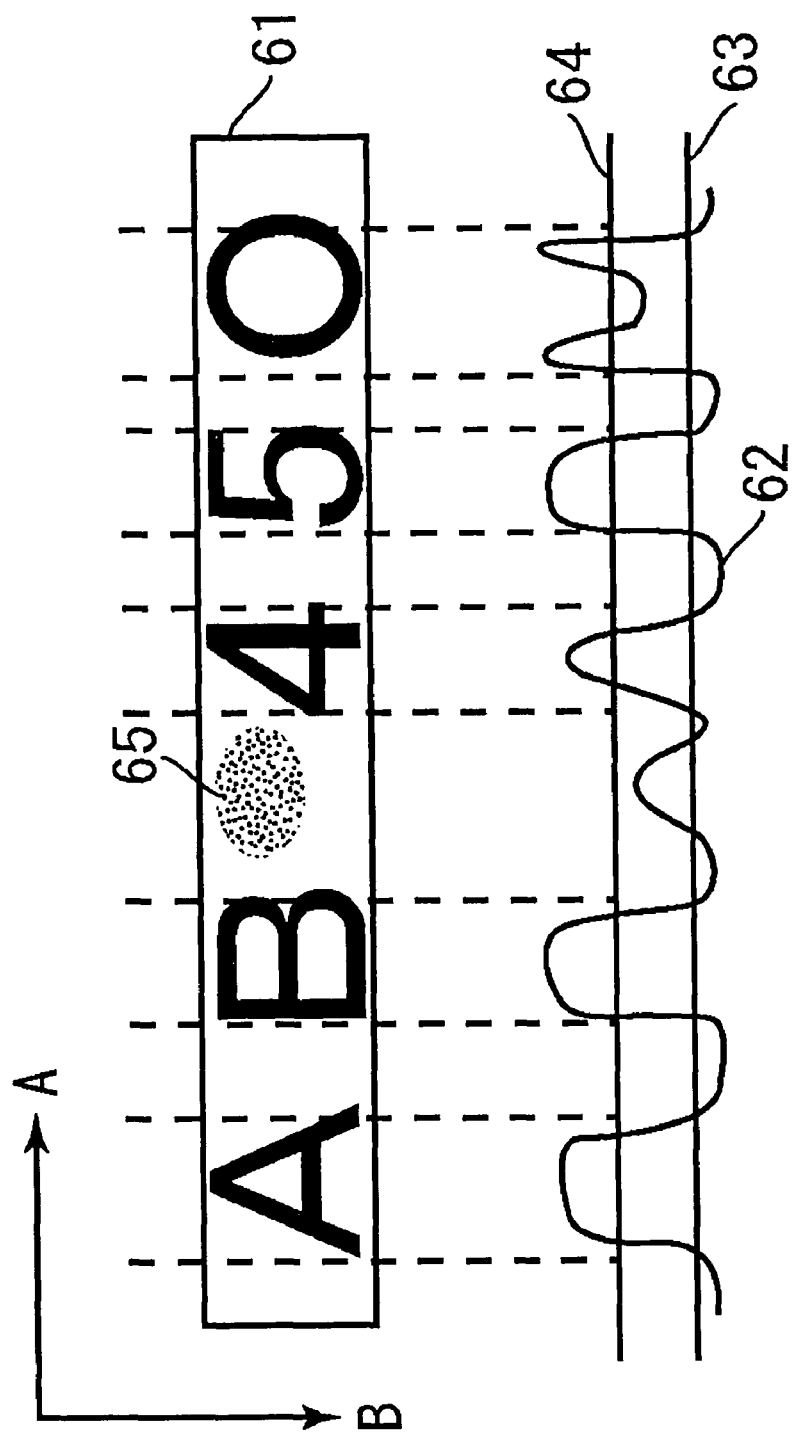
FIGS. 3A and 3B are diagrams showing the procedure of the character extracting step.

Referring now to FIG. 3, the character extracting method of the present invention will be described. The character extraction step is a preprocessing step of recognizing characters included in a captured image and is a process of extracting the area of each of the characters included in a character string in a captured image. In the character extracting process, a line including the character string is extracted from the captured image and each of the characters of the character string is extracted from the character string.

FIG. 3A is a diagram showing an image 61 of a line (a character string) extracted. In the other words, the image 61 includes the character string to be extracted. A size of a rectangular shaped window to surround all the character string to be extracted is automatically decided based on the following conditions. A width of the rectangular shaped window is decided by an extraction starting character's position and an extraction ending character's position in an extraction direction. For example, when the extraction direction is from the left side to the right side in FIG. 3A, the extraction starting character's position is the most left side positioning part of the "A" character and also the extraction ending character's position is the most right side positioning part of the "0" character. Based on this position information, the width of the rectangular shape wind is decided. In the present embodiment of the present invention, as shown in FIG. 3A, the width position is decided by position information of the characters "A" and "0" with additional outward margin to each of the position information characters "A" and "0". A height of the rectangular shaped window is decided by positions of the highest part and the lowest part of all the characters included into the character string to be extracted. Based on the above extraction condition of the character string, the image 61 includes a character string "AB450" as shown in FIG. 3A. Noise 65 also exists between the character "B" and the character "4". The noise 65 is, for example, dirt in a background part.

Directions A and B are defined as shown in the figure. The direction A will be called a character string direction A, and the direction B will be called a character extracting direction B. The direction A can be also called a line extracting direction A indicating an character string arrangement direction to be extracted. As shown in the figure, the direction A is orthogonal to the direction B. In other words, the direction B is defined to be orthogonal to the direction A, after the character string is extracted. That is, the image 61 is an image extracted in the line extracting direction A from the captured image and, in a following process, extraction in the character extracting direction B is performed, thereby extracting character areas corresponding to each character from the image 61.

FIG. 3B is a diagram showing a pixel value integration evaluation value obtained by integrating pixel values in the character extracting direction B of the image 61 at each coordinate position in a character string direction A.

A pixel value integration evaluation value is calculated at each of the pixel positions (coordinate positions) in the character string direction A and expressed as waveform data 62. The waveform data 62 is used as data for evaluating a character area. That is, different from the background part, in the area in which a character exists, the pixel value integration evaluation value is large, and the character area can be evaluated.

To largely express the waveform data 62 in the character areas, in a case where characters are in black, the characters are reversed, and the pixel value integration evaluation value is obtained. That is, the image 61 is a monotone image in which the pixel value (density) is, for example, 0 to 255. In the case where the background is black and the character color is white, the character part has a high brightness. Consequently, it is sufficient to use a value obtained by integrating pixel values as a pixel value integration evaluation value. When the background is white and the character color is black, the character part has a low brightness. Consequently, the pixel values 0 to 255 are converted to pixel values 255 to 0. A value obtained by integrating the reversed pixel values is employed as a pixel value integration evaluation value. Therefore, irrespective of the character color which is black or white, the character part can be handled in the same manner so that the pixel value integration evaluation value becomes large.

As shown in FIG. 3B, a first threshold 63 and a second threshold 64 are set for the waveform data 62. The first threshold 63 is a threshold for determining a character candidate section. An area in which the pixel value integration evaluation value exceeds the first threshold 63 is determined as a character candidate section. The second threshold 64 is a threshold for selecting a true section between the characters from character candidate sections and is set as a value larger than the first threshold 63. Concretely, in a case where an area whose pixel value integration evaluation value exceeds the second threshold 64 exists in the section determined as a character candidate section, the character section is determined as a true character section.

Flow of the Processes

Figure 4:
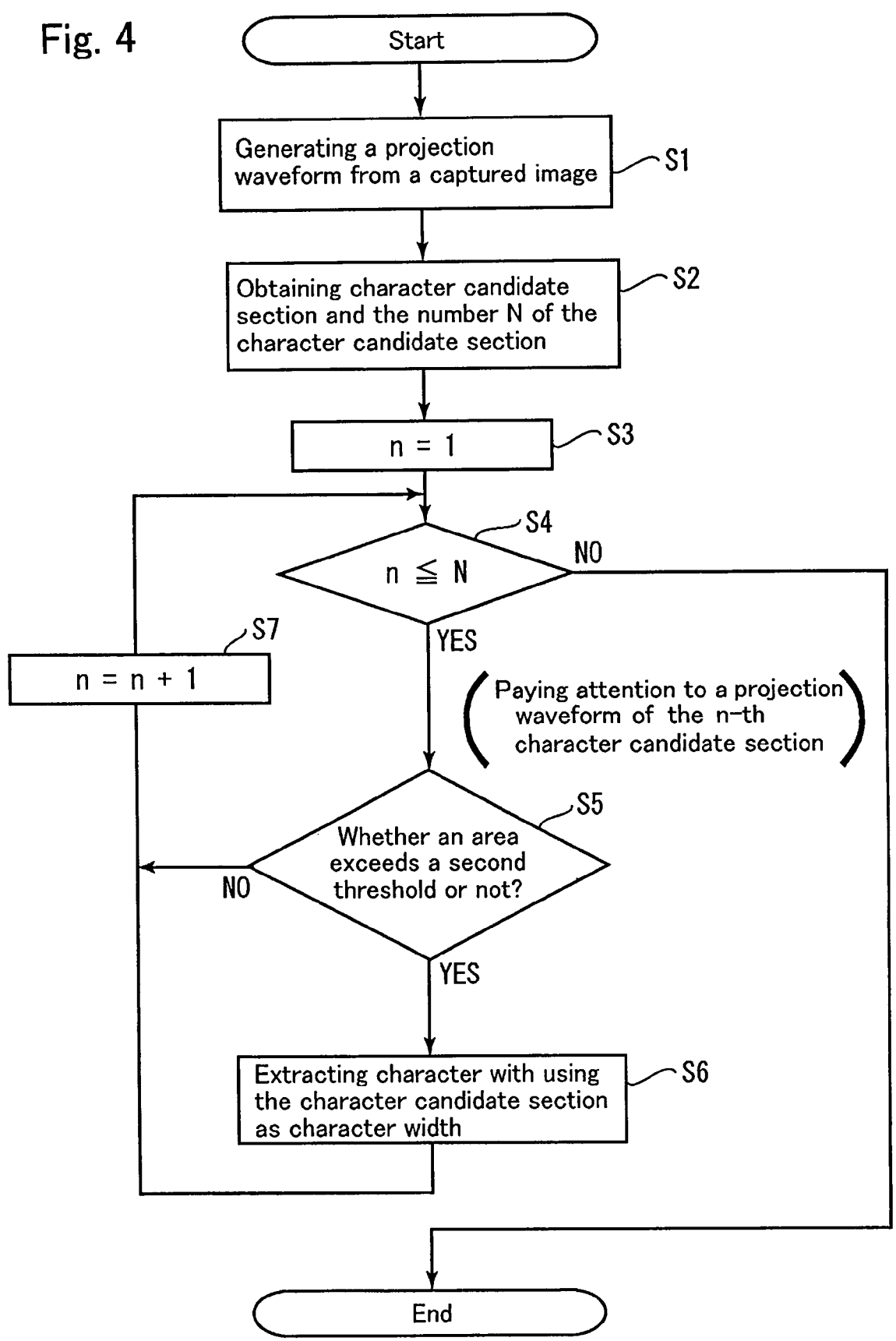
FIG. 4 is a general flowchart of the character extracting process.

Next, the flow of the character extracting process will be described with reference to the flowchart of FIG. 4. The character extracting process includes, as described above, extraction in the line extracting direction A and extraction in the character extracting direction B. The extracting method of the present invention can be applied to both of the extracting processes. The flowchart of FIG. 4 shows the process flow common to both of the extracting processes. A process of extracting a character from a line extracted from an image, in the character extracting direction B will be described as an example.

First, the camera 2 captures the characters 81 printed on the medium 80, and the image input unit 11 inputs a captured image and stores it to the image storing unit 12. The image processing unit 13 reads the image stored in the image storing unit 12 and executes the following process.

The image processing unit 13 generates projection data of the captured image (step S1). That is, the image processing unit 13 computes the pixel value integration evaluation value at each of the pixel positions in the character string direction A. The waveform data 62 in FIG. 3B shows the pixel value integration evaluation value calculated in such a manner.

The image processing unit 13 sets an area in which the pixel value integration evaluation value is larger than the first threshold 63 as a character candidate section and obtains the number N of the character candidate sections (step S2). That is, the image processing unit 13 sets an area higher than the first threshold 63 in the waveform data 62 as the character candidate section and obtains the number N of the areas where the pixel value integration evaluation value exceeds the first threshold 63.

The image processing unit 13 sets 1 as a variable "n" (step S3) and determines whether the variable "n" exceeds the number N of the character candidate sections (step S4). When the variable "n" does not exceed the number N, attention is paid to a projection waveform of the n-th character candidate section, and the image processing unit 13 determines whether an area in which the pixel value integration evaluation value exceeds the second threshold 64 exists in the n-th character candidate section or not (step S5).

In a case where the area in which the pixel value integration evaluation value exceeds the second threshold 64 exists in the n-th character candidate section (YES in step S5), a character is extracted by using the character candidate section as the character width (step S6). That is, the character candidate section is set as the true character section. On the other hand, when the area in which the pixel value integration evaluation value exceeds the second threshold 64 does not exist in the n-th character candidate section (NO in step S5), the character extracting process is not performed. That is, the character candidate section is not employed as a true character section.

After the character extraction is performed in step S6 or NO is determined in step S5, the variable "n" is incremented by one (step S7) and whether the variable "n" exceeds the number N of character candidate sections or not is determined again. The steps S5 and S6 are repeated until the variable "n" exceeds N, and a process of determining whether the character candidate section is employed as the true character section or not is performed. After completion of the process on all of the character candidate sections (NO in step S4), the process is finished. After the character area is extracted, the character recognizing process is performed by the image processing unit 13.

FIGS. 5A to 5E through FIG. 8 are diagrams showing an example of performing the character extracting method on an actual image. The images show a process example of extracting characters in the character extracting direction B from an image 71 extracted in the line direction A.

Figure 5:
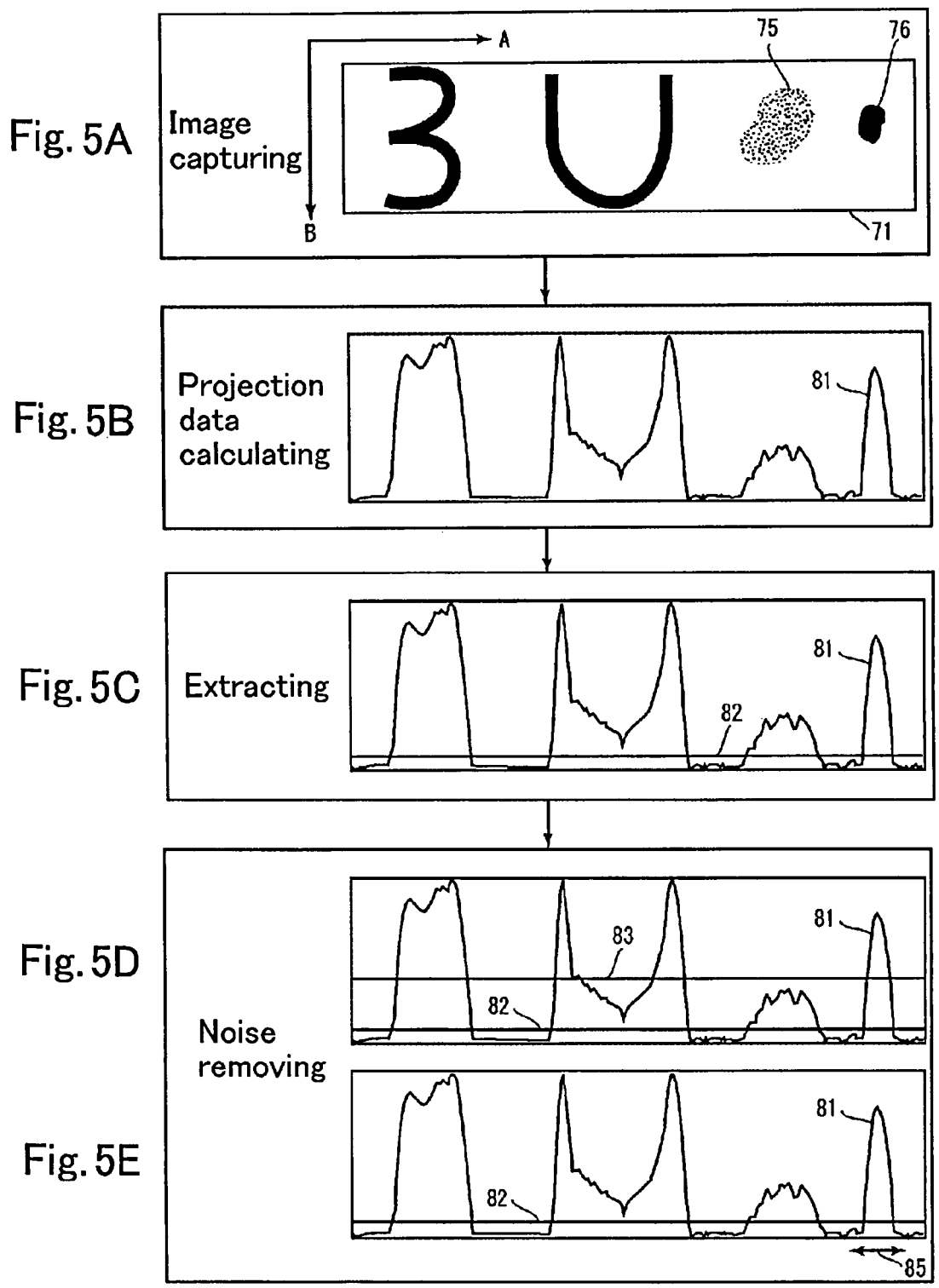
FIGS. 5A to 5E are diagrams showing an example of the character extracting process.

As shown in FIG. 5A, an image 71 is obtained first. The image 71 includes characters "3U". Noise 75 having a low density and a wide area and noise 76 having a high density and a narrow area are included in the image 71.

FIG. 5B shows waveform data 81 obtained from the image 71. Specifically, FIG. 5B shows the waveform of pixel value integration evaluation values obtained in the character extracting direction B at pixel positions in the character string direction A of the image 71.

Figure 6:
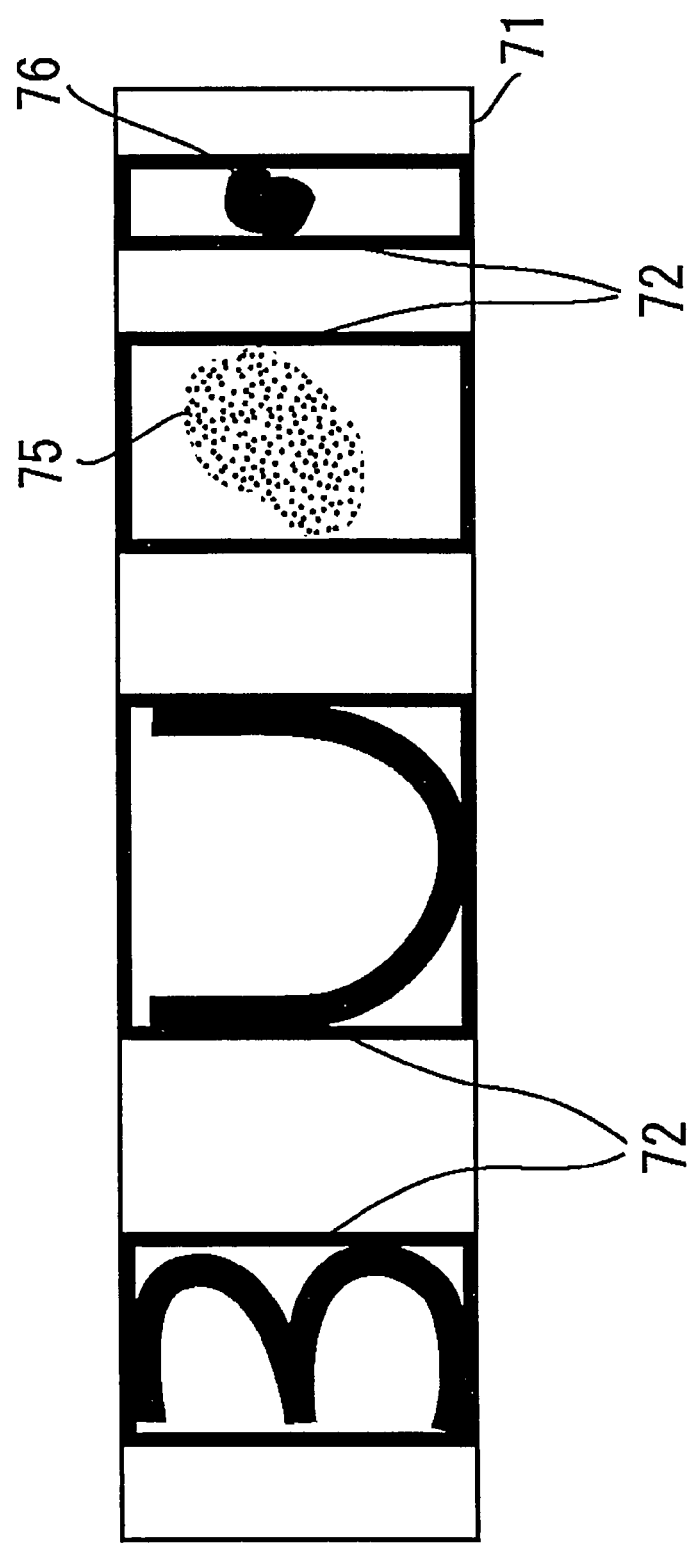
FIG. 6 is a diagram showing characters extracted with a first threshold.

FIG. 5C shows a state where a first threshold 82 (corresponding to the first threshold 63 in FIG. 3) is set in the waveform data 81. In FIG. 6, character candidate sections are obtained from areas exceeding the first threshold 82 and, based on the character candidate sections, character extraction areas are displayed in the rectangles 72. As understood from the figure, not only the characters "3" and "U" but also the noises 75 and 76 are surrounded by the rectangles 72 as the character extraction areas.

FIGS. 5D and 5E are diagrams showing a state of the noise eliminating process. To eliminate noise, a second threshold 83 (corresponding to the second threshold 64 in FIG. 3) is set and noise width 85 is also set.

Figure 7:
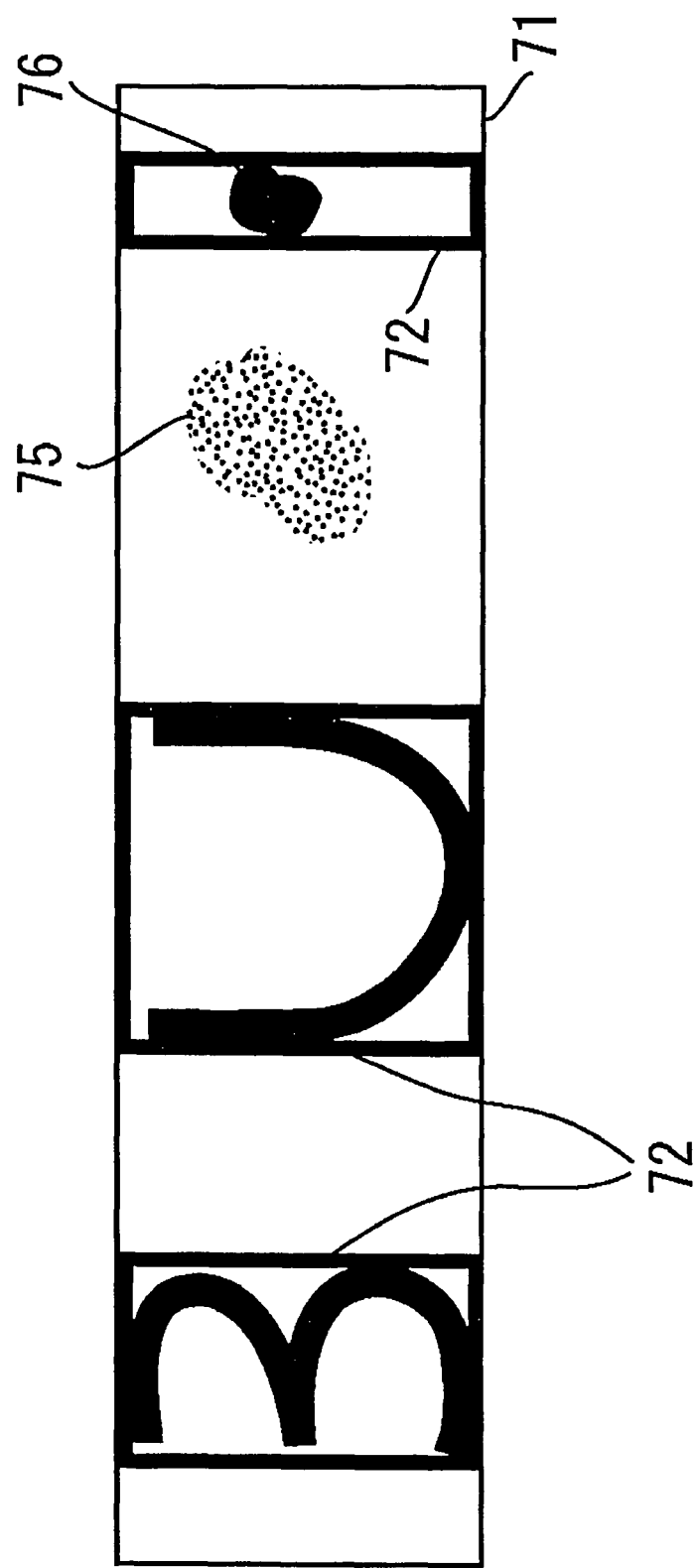
FIG. 7 is a diagram showing a character extracting state after a determination with a second threshold is made.

The second threshold 83 is set, as described above, to eliminate a noise area in which the maximum value of density is low from the character candidate sections. As shown in FIG. 5D, since the second threshold 83 having a value larger than the first threshold 82 is set, the waveform part corresponding to the noise 75 goes below the second threshold 83 and is excluded from the character areas. In FIG. 7, the rectangles 72 show the character extraction areas in a case where only sections each including the area in which the pixel value integration evaluation value exceeds the second threshold 83 are set as character sections out of the character candidate sections. It is understood that the noise 75 is excluded from the character extraction areas.

Figure 8:
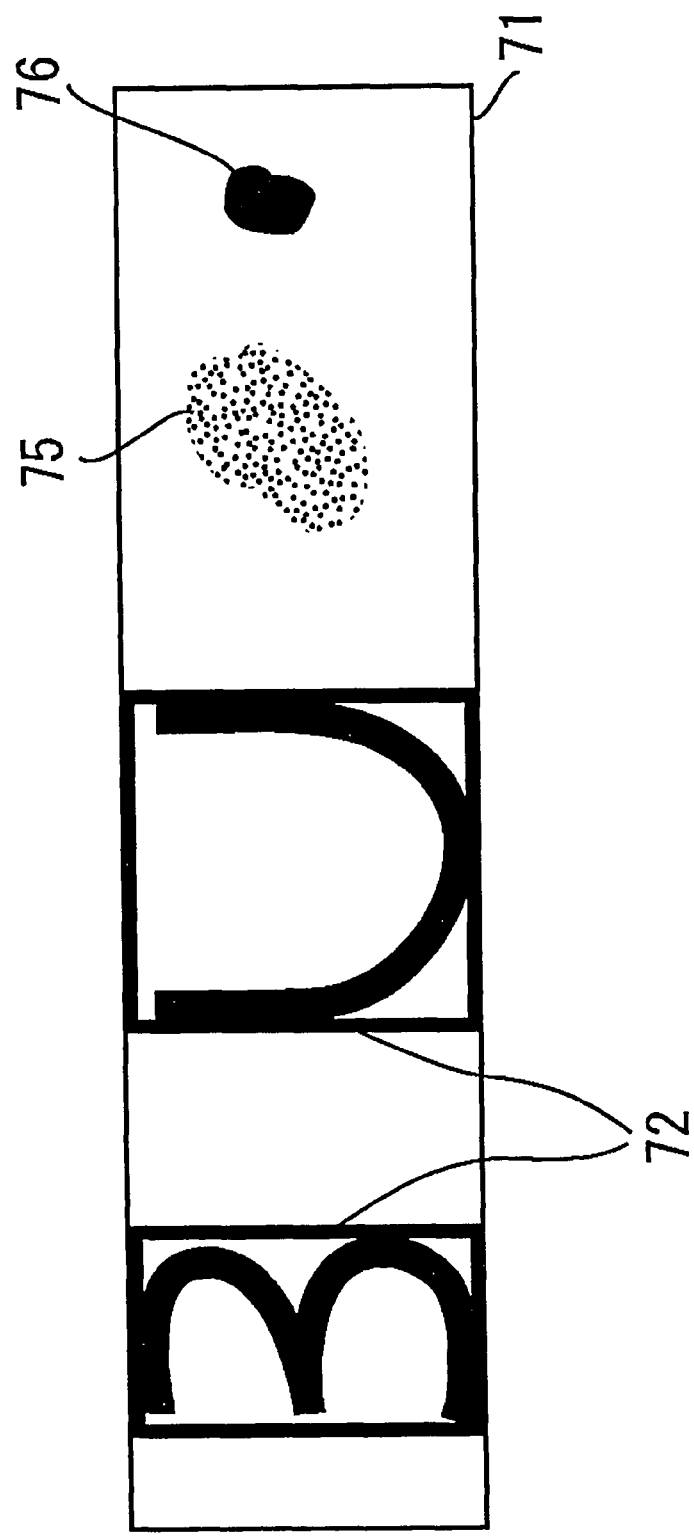
FIG. 8 is a diagram showing a character extracting state after determination with a noise width is made.

The noise width 85 is set, as described in the related art, in order to exclude noise such as small dirt from the character sections. As shown in FIG. 5E, by setting the noise width 85, the section exceeding the first threshold 82 in the waveform corresponding to the noise 76 becomes narrower than the noise width 85 and is excluded from the character area. In FIG. 8, the rectangles 72 show the character extraction areas in a case where sections each including the area in which the pixel value integration evaluation value exceeds the second threshold 83 and each wider than the noise width 85 are set as true character sections out of the character candidate sections. It is understood that the noises 75 and 76 are excluded from the character extraction areas.

By setting the noise width 85 in addition to the second threshold 83 as described above, both of the darkest noise and the noise having a narrow area can be excluded from the character sections. In short, by the noise elimination using the second threshold 83, noise which is light but has a wide area is eliminated. A noise which is sharp but obviously thinner (smaller) than a character such as a streak or dot noise can be eliminated by using noise elimination with the noise width 85.

Figure 9:
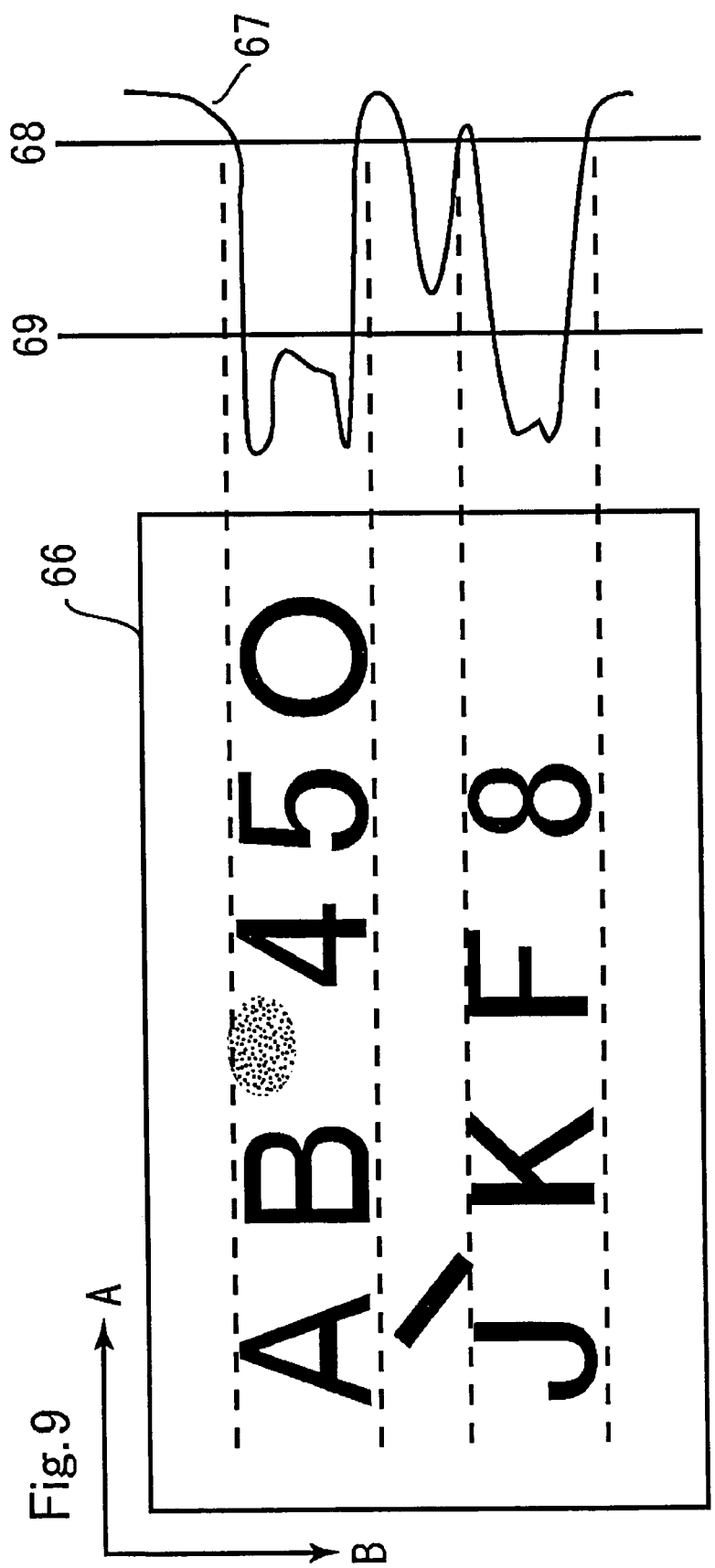
FIG. 9 is a diagram showing the procedure of the line extracting step.

Although the extracting method in the character extracting direction B has been described, as mentioned above, the character extracting method of the present invention can be applied to both the extraction in the line extracting direction A and extraction in the character extracting direction B. FIG. 9 is a diagram showing a state of the extracting method in the line extracting direction A.

An image 66 includes a plurality of character strings. In the image 66, the pixel value integration evaluation value is obtained in the line extracting direction A. Waveform data 67 shows the pixel value integration evaluation values obtained in the line extracting direction A at the pixel positions in the character extracting direction B.

For the waveform data 67, a first threshold 68 and a second threshold 69 are set. Specifically, an area in which the pixel value integration evaluation value exceeds the first threshold 68 is set as a character candidate section (in this case, it can be also called a line candidate section). From character candidate sections, a section including an area in which the pixel value integration evaluation value exceeds the second threshold 69 is employed as a true character section.

As described above, the character extracting operation is performed with the first and second thresholds 68 and 69 also in the line extracting direction A. In a manner similar to the case described with reference to FIGS. 5A to 5E, noise elimination may be performed using the noise width.

By determining the true character sections using the first and second thresholds in both of the line extracting direction A and the character extracting direction B, the character areas can be determined.

In the image processing system of the embodiment as described above, the character section is determined by using two thresholds of the first and second thresholds. Consequently, while eliminating a noise component from a character section, a character area can be detected with a high precision. In particular, noise having a wide area (having a size similar to that of a character) which is conventionally difficult to be detected as noise can be excluded from the character area in a case where the density difference between the noise and the background is small. To eliminate such noise, the second threshold separately set is used without using the first threshold for extracting characters, so that no adverse influence is exerted on the area of a character to be extracted.

User Interface

Figure 10:
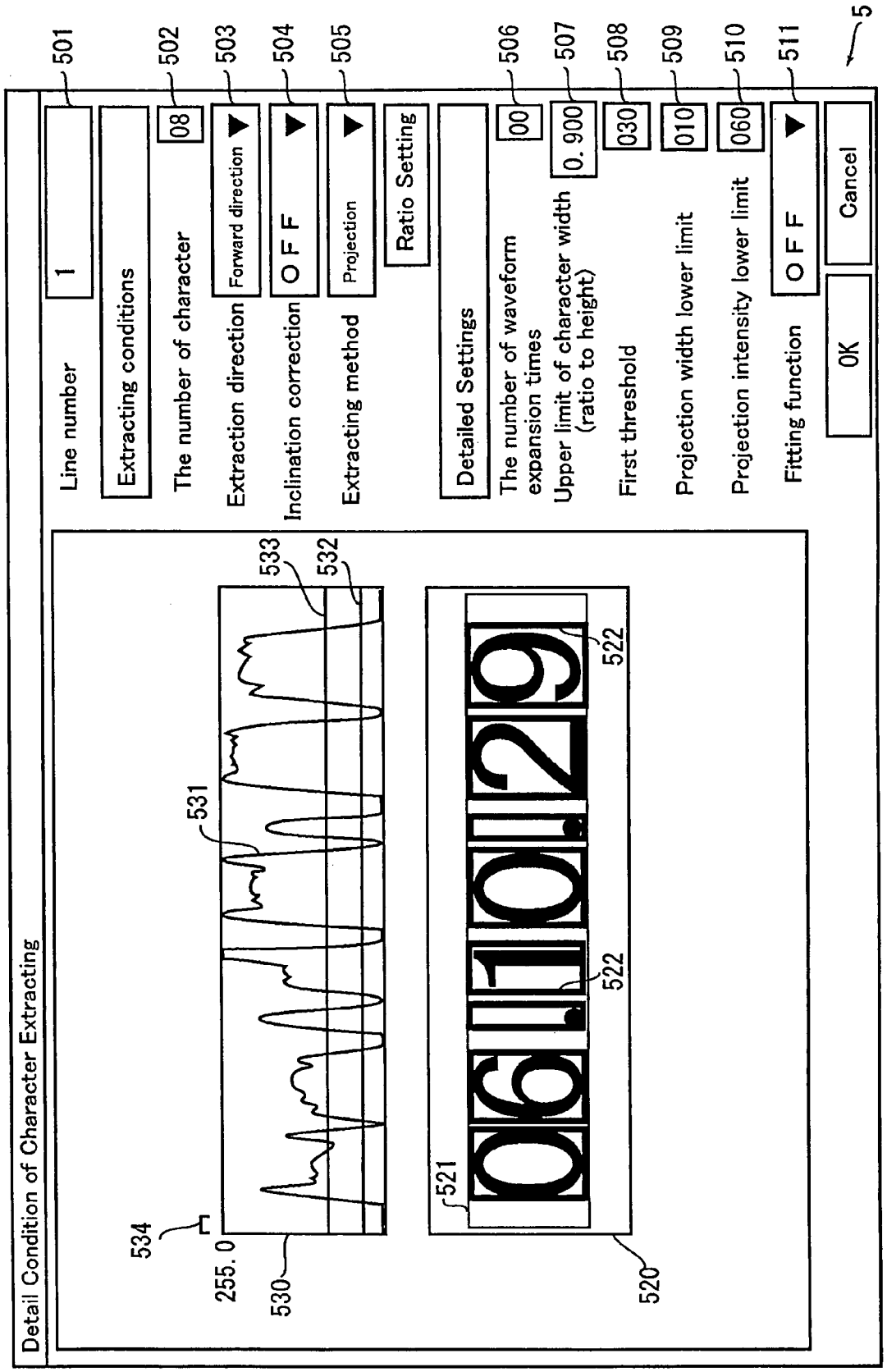
FIG. 10 is a diagram showing a user interface for the character extracting process.
Figure 11:
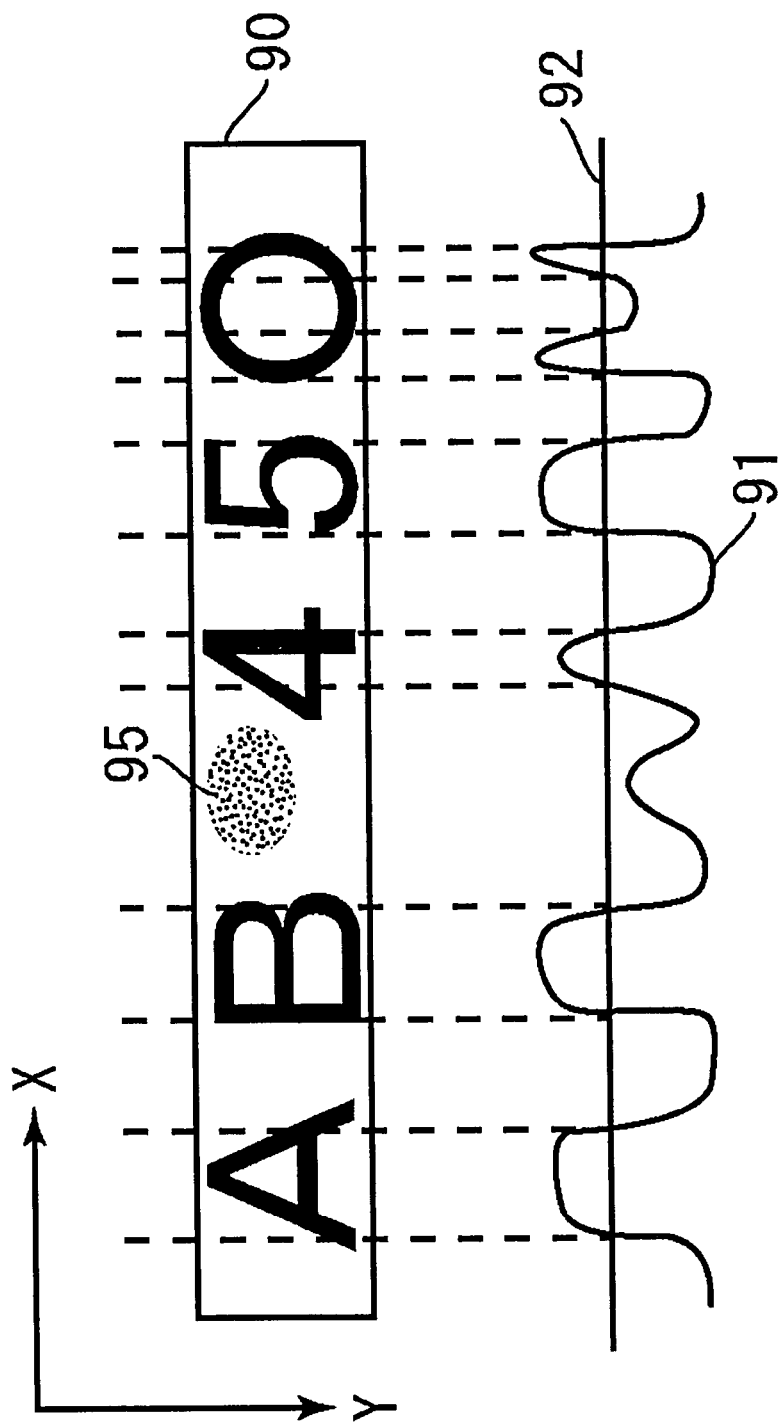
FIG. 11 is a diagram showing a problem in a conventional character extracting process.
Figure 12:
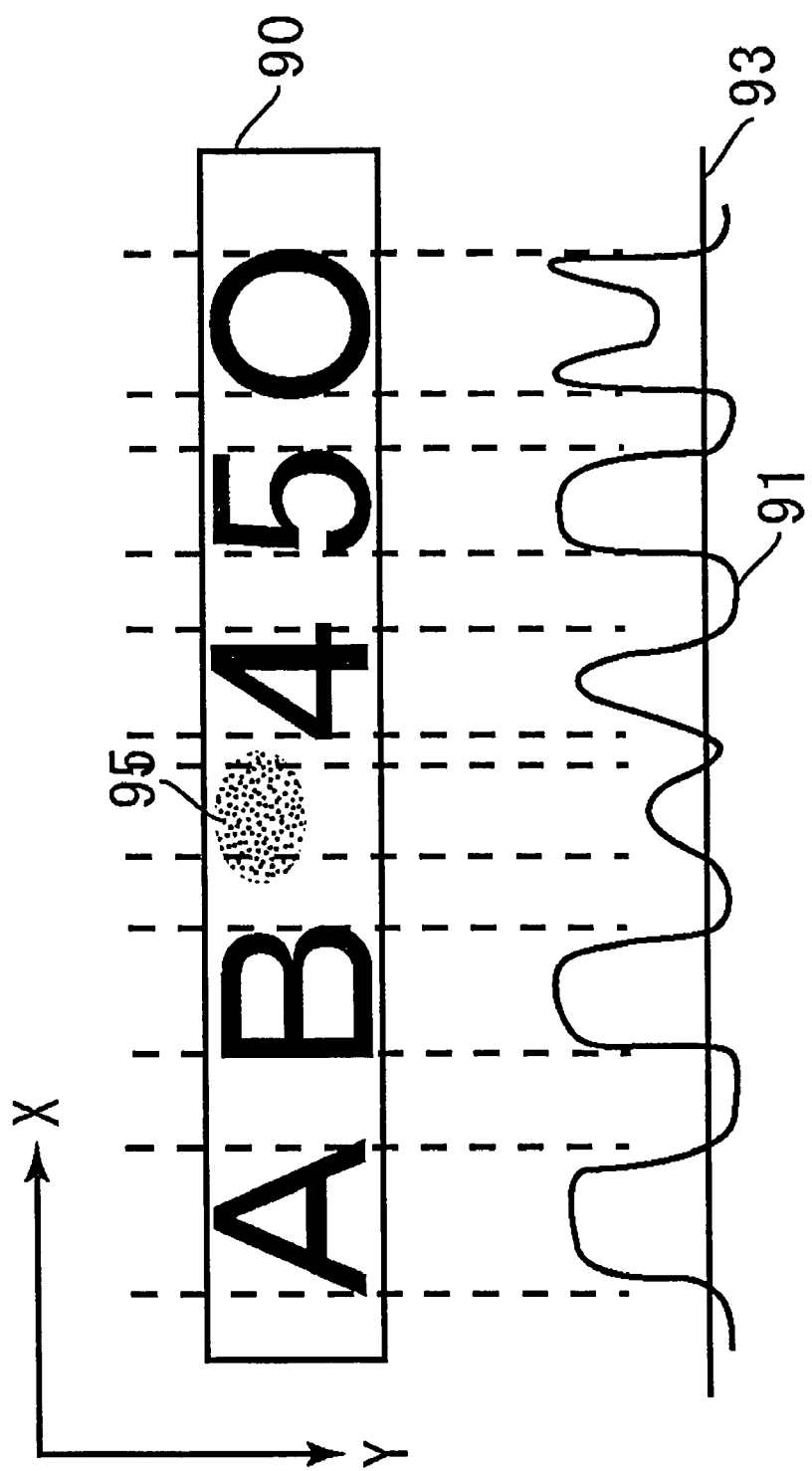
FIG. 12 is a diagram showing another problem in the conventional character extracting process.

FIG. 10 is a diagram showing a setting confirmation screen 5 displayed on the monitor 3 at the time of executing the character extracting process. The setting confirmation screen 5 has setting parts 501 to 511 arranged on the right side of the screen and an image process area 520 and a waveform display part 530 disposed in the center of the screen. The user can adjust the character extracting process by operating the operating unit 14 to change the parameters in the setting parts 501 to 511 while seeing an image displayed in the image process area 520 and a waveform 531 displayed in the waveform display part 530. A rectangle 521 in the image process area 520 shows the line extraction area. Further, a positioning relationship between the image process area 520 and the waveform display part 530 on the setting confirmation screen 5, is determined so that each character displayed on the image process area 520 is in the same position of a part of the waveform displayed on the display part 530 corresponding to the character displayed on the image process area in the line extracting direction A.

Accordingly, it is easy to understand the positioning relationship between specified character displayed on the image process area 520 and a part of the waveform displayed on the waveform display part 530 corresponding to the specified character displayed on the image process area 520. At this embodiment, the waveform display part 530 is disposed at an upper part of the setting confirmation screen 5 and the image process area 520 is disposed at a lower part of the setting confirmation screen 5. However, to obtain the above-mentioned effect, it is also preferred that the waveform display part 530 is disposed at the lower part of the setting confirmation screen 5 and the image process area 520 is disposed at the upper part of the setting confirmation screen 5.

The image process area 520 is an area displaying an image including characters to be processed. In the figure, an image of a medium on which the date (Jun. 10, 1929) is printed is displayed. In the image process area 520, extracted character areas are displayed so as to be surrounded by rectangles 522. The figure shows a state where each of characters "0", "6", and the like is surrounded by a rectangle 522 and extracted as a character area. The user can recognize the character extraction state by seeing and checking the display.

In the waveform display part 530, waveform data 531 (corresponding to the waveform data 62 in FIG. 3B) are displayed. A first threshold 532 and a second threshold 533 are displayed so as to be overlaid on the waveform data 531. By seeing and checking the display, the user can know the relation between the waveform and the first and second thresholds and an area to be extracted as a character area in relation with the thresholds.

By entering a setting value in a setting part 508, the user can change the value of a first threshold 532 (extraction threshold). In the case of no-input of any value to this setting part by the user, a value "40" is set as a default value of the first threshold 532. In this embodiment, one of the value "0" through the value "255" can be set as a desired threshold value and the higher value is corresponding to a character part. Accordingly, when the user does not input any value into the setting part 508, automatically the first threshold 532 is displayed at a position indicating "40" as a value on the image process area 520. When the first threshold 532 is changed by the user, the character extraction position is also changed, so that the position and the size of the rectangle 522 displayed in the image process area 520 is also changed. In such a manner, the user can recognize the character extraction position while changing the first threshold 532.

By entering a setting value in a setting part 510, the user can change the value of a second threshold 533 (projection intensity lower limit). The second threshold 533 set by inputting a value into the setting part 510 is required so that the second threshold value is equal to or higher than the first threshold value set at the setting part 508. Accordingly, by adding an input value into the setting part 510 to the first threshold 532 set by the setting part 508, the second threshold 533 is obtained. Further, when the user does not input any value into the setting part 510, a value "25" is set as a default value to add to the first threshold. Therefore, if the user input "60" as input value to the setting part 508 and does not input any value to the setting part 510, the second threshold 533 becomes "85" which is obtained by adding "60" as the first threshold to "25" as the default value for the setting part 510. When the second threshold 533 is changed by the user, the character extraction determination criterion is changed, so that the number of rectangles 522 displayed in the image process area 520 is also changed. In such a manner, the user can recognize the character extraction position while changing the second threshold 533. Furthermore, as another setting method to set a value to the setting part 510, it is also preferred that the same value as the set value in the setting part 508 is displayed at the setting part 510 and it only accepts a value for inputting to the setting part 510 which is higher than the set value to the setting part 508.

By entering a setting value in a setting part 509, the user can change the value of a noise width 534 (projection width lower limit). When the noise width 534 (corresponding to the noise width 85 in FIG. 5E) is changed by the user, the character extraction determination criterion is also changed, so that the number of rectangles 522 displayed in the image process area 520 is also changed. In such a manner, the user can recognize the character extraction position while changing the noise width 534.

The meaning of the other setting parts 501 to 511 will be described. A setting part 501 can set the line number. When there is a plurality of character strings in the acquisitioned image, for example, each character string is given a corresponding number automatically in the image processing apparatus. Accordingly, the user designates a specified character string by using the corresponding number to the specified character string. Thus, the designated character string is displayed on the image process area 520. A setting part 502 can set the number of characters to be extracted. In a case where the number of characters to be extracted is determined in advance, the number of characters is set in the setting part 502. In more detail, the number of character to be extracted can be determined with one of a forward direction, a backward direction or in order based on a character size which will be described below at a setting part 503. By these settings, the character extraction precision can be improved and also only the characters required to be extracted by the user can be extracted with the other extraction conditions. The setting part 503 can set the extraction direction of the characters to be extracted. In the present embodiment, the setting part 503 can be set as one of "Forward direction", "Backward direction" and "In order based on character size". "Forward direction" means starting extraction of the characters from the left side of the image process area 520 in FIG. 10. "Backward direction" means starting extraction of characters from the right side of the image process area in FIG. 10 namely, an opposite direction to "Forward direction". "In order based on character size" means extracting the character from the character string in order based on the larger size of the character in the character string. As another embodiment to the setting part 503, since this setting part basically is required to decide the direction to start extraction of character, it is enough to provide only "Forward direction" and "Backward direction" as items to be selected. A setting part 504 can be selected so that inclination correction is made or not. When characters are inclined to the arrangement direction of the character string, for example italicized characters, projection data (pixel value integration evaluation values) of the neighboring characters overlap each other. Therefore, whether a process of correcting an inclined character is performed or not is set. When it is set "ON" at the setting part 504, the image processing apparatus 1 detects the inclined angle of the characters of the character string and produces a corrected and non-inclined character string based on the detected inclined angle automatically. Then, the extracting processing is carried out to the corrected character string. When this inclination correction is not required, the user may select "OFF". A setting part 505 can set an extraction method. In detail, "Projection" and "Ratio Designation" are provided as the extraction methods to be selected. The extraction using "Projection" can be carried out for each character extraction based on the pixel value integration evaluation value obtained by integrating pixel values along the orthogonal direction to the arrangement direction of the character string at each pixel position of the arrangement direction of the character string to be extracted. On the other hand, the extraction using "Ratio Designation" can be carried out based on the same function of the extraction of the "Projection" with setting a position of a character to start the extraction and a position of a character to finish the extraction and the size of a space between characters to be extracted. Therefore, when "Ratio Designation" is selected, another dialog box (not shown) appears on the monitor 2 and the positions to the above-mentioned setting parameters can be specified based on giving values which are defined numerals 0 through 100 as the coordinate position corresponding to a first character through a final character existing in the character string.

A setting part 506 can set the number of waveform expansion times. The setting is made to prevent the waveform from forming the waveform intermittently. This setting part function is available for character forming by a dot aggregate. In the other words, since a character formed by dot aggregate has a space between the dots, the pixel value integration value of the position corresponding to the space is extremely lower than the pixel value integration value corresponding to the other portion to the character. Therefore, the waveform corresponding to the character formed by dots may have a discontinued shape. In such a case, the discontinued-shape waveform can be changed to a continued-shape waveform by expanding each dot at least to the arrangement direction of the character string. Further, since the space size between dots is different for each character, the setting part 506 can set the number of waveform expansion times to provide an appropriate expansion size to any type of character formed by dots. A setting part 507 can set the upper limit of the character width. In the figure, the character width is set as a ratio to the character height. The upper limit value is used for a process of separating characters in contact with each other or the like. A setting part 511 can be set whether fitting is performed or not. Fitting of the extraction area having a rectangular shape in accordance with a character shape is effective in a case where the position of a character in the vertical direction (character extraction direction) shifts. In more detail, in this embodiment, when the "Fitting Function" is not selected, each position of the upper side and the lower side of the rectangular shape extraction area surrounding each character to be extracted from the character string is fixed by a highest position to all the characters to be extracted from the character string and the lowest position to all the characters to be extracted from the character string. Therefore, in the case of some extracted character like two periods shown in FIG. 10, there is no character part to an upper space of the rectangular shape extraction area corresponding to each of the two "periods" in the figure. This biased character layout in the extraction area is not effective for the character recognition process like a pattern matching process, since the partial space in the extraction area is a no character part and such information of the partial space has no meaning for the character recognition process. To solve such a problem, this setting part 511 is very useful. In detail, by selecting the "Fitting Function" at the setting part 511, in case of the above-mentioned "period", since it is able to provide the rectangular-shaped extraction area fitting to a height of "period", it can reduce obtaining a useless space in the extraction area and also the following image processing process, like the character recognition process, can be carried out effectively.

Further, each setting part from the setting part 501 to 511, when it is selected one condition from a plurality of selectable functions, it is preferred to use a pull-down menu selection method to select a desired function.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents This application is based on Japanese Patent Application No. 2006-248369, filed on Sep. 13, 2006, and Japanese Patent Application No. 2007-218700, filed on Aug. 24, 2007, the contents of which are incorporated hereinto by reference.

What is claimed is:

1. An apparatus for extracting each character from a character string having a plurality of characters arranged in a first direction and included in an image and including a non-transitory computer readable medium, comprising:
   an integrating device integrating pixel values along a second direction orthogonal to the first direction for all coordinate positions in the first direction of the image;
   a first threshold setting device setting a first threshold;
   an extracting device extracting an area corresponding to a coordinate position along the first direction where the integrated pixel value exceeds the first threshold set by the first threshold setting device as a character candidate area;
   a second threshold setting device setting a second threshold that is larger than the first threshold set by the first threshold setting device; and
   a recognition device determining, with respect to the character candidate areas, whether an area in which the integrated pixel value exceeds the second threshold exists or not, and recognizing the area in which the integrated pixel value exceeds the second threshold as a character area.

2. The character extracting apparatus according to claim 1, further comprising:
   a display device including,
   a character string display part for displaying a character string having a plurality of characters;
   a character area display device surrounding each character included in the character area recognized by the recognition device with a rectangular-shaped window;
   a waveform display part for displaying a waveform formed by the pixel values integrated by the integrating device for all coordinate positions in the first direction along the first direction; and
   the display device displaying each character displayed on the character string display part and a part of the displayed waveform on the waveform display part corresponding to each character displayed on the character string display part with a mutual positioning relationship on the display device.

3. The character extracting apparatus according to claim 2, wherein a width of the rectangular-shaped window surrounding each character of the character area is determined based on the width of each character candidate width extracted by the extracting device with the first threshold.

4. The character extracting apparatus according to claim 2, further comprising:
   a waveform expansion time setting device setting the number of waveform expansion times in the first direction.

5. The character extracting apparatus according to claim 2, further comprising:
   a window height fitting device fitting the height of the window surrounding the character recognized by the recognition device to the height of the character surrounded by the window.

6. The character extracting apparatus according to claim 1, further comprising:
   a waveform display part for displaying a waveform formed by the pixel values integrated by the integrating device for all coordinate positions in the first direction and the first and second thresholds set by the first and second threshold setting devices overlapping the waveform.

7. The character extracting apparatus according to claim 6, further comprising:
a waveform expansion time setting device setting the number of waveform expansion times in the first direction.

8. The character extracting apparatus according to claim 1, further comprising:
a display device including,
a character string display part for displaying a character string having a plurality of characters;
a character area display device surrounding each character included in the character area recognized by the recognition device with a rectangular-shaped window;
a waveform display part for displaying a waveform formed by the pixel values integrated by the integrating device for all coordinate positions in the first direction and the first and second thresholds set by the first and second threshold setting devices overlapping the waveform; and
the display device displaying each character displayed on the character string display part and a part of the displayed waveform on the waveform display part corresponding to each character displayed on the character string display part with a mutual positioning relationship on the display device.

9. The character extracting apparatus according to claim 8, wherein a width of the rectangular-shaped window surrounding each character of the character area is determined based on the width of each character candidate width extracted by the extracting device with the first threshold.

10. The character extracting apparatus according to claim 8, further comprising:
a waveform expansion time setting device setting the number of waveform expansion times in the first direction.

11. The character extracting apparatus according to claim 8, further comprising:
a window height fitting device fitting the height of the window surrounding the character recognized by the recognition device to the height of the character surrounded by the window.

12. The character extracting apparatus according to claim 1, further comprising:
a character area width setting device setting a character area width; and
a removing device removing the character area having a smaller character area width than the character area width set by the character area width setting device from the character candidate area extracted by the extracting device with the first threshold.

13. The character extracting apparatus according to claim 1, wherein the second threshold setting device includes:
an additional value setting device setting an additional value to add to the first threshold set by the first threshold setting device; and
an adding device adding the first threshold set by the first threshold setting device to the additional value set by the additional value setting device to obtain the second threshold.

14. The character extracting apparatus according to claim 1, further comprising:
a character extraction direction setting device setting a character extraction direction along the first direction; and
a character setting device setting the number of characters to be extracted from the character extraction direction set by the character extraction direction setting device.

15. A non-transitory computer readable medium including a program for extracting each character from a character string having a plurality of characters arranged in a first direction and included in an image, comprising the steps of:
integrating pixel values along a second direction orthogonal to the first direction for all coordinate positions in the first direction of the image;
setting a first threshold;
extracting an area corresponding to a coordinate position along the first direction where the integrated pixel value that exceeds the first threshold as a character candidate area;
setting a second threshold which is larger than the first threshold; and
determining, with respect to the character candidate areas, whether an area in which the integrated pixel value exceeds the second threshold exists or not, and recognizing the area in which the integrated pixel value exceeds the second threshold as a character area.

16. A non-transitory computer readable medium including a program for extracting each character from a character string having a plurality of characters arranged in a first direction and included in an image, the program including:
an integrating device integrating pixel values along a second direction orthogonal to the first direction for all coordinate positions in the first direction of the image;
a first threshold setting device setting a first threshold;
an extracting device extracting an area corresponding to coordinate position along the first direction where the integrated pixel value exceeds the first threshold set by the first threshold setting device as a character candidate area;
a second threshold setting device setting a second threshold that is larger than the first threshold set by the first threshold setting device; and
a recognition device determining, with respect to the character candidate areas, whether an area in which the integrated pixel value exceeds the second threshold exists or not, and recognizing the area in which the integrated pixel value exceeds the second threshold as a character area.

* * * * *